(12) United States Patent
Nezhadarya et al.

(10) Patent No.: US 10,983,217 B2
(45) Date of Patent: Apr. 20, 2021

(54) METHOD AND SYSTEM FOR SEMANTIC LABEL GENERATION USING SPARSE 3D DATA

(71) Applicants: Ehsan Nezhadarya, Thornhill (CA); Amirhosein Nabatchian, Maple (CA); Bingbing Liu, Singapore (SG)

(72) Inventors: Ehsan Nezhadarya, Thornhill (CA); Amirhosein Nabatchian, Maple (CA); Bingbing Liu, Singapore (SG)

(73) Assignee: Huawei Technologes Co. Ltd., Shenzhen (CN)

( * ) Notice: Subject to any disclaimer, the term of this patent is extended or adjusted under 35 U.S.C. 154(b) by 223 days.

(21) Appl. No.: 16/206,465

(22) Filed: Nov. 30, 2018

(65) Prior Publication Data

US 2020/0174132 A1 Jun. 4, 2020

(51) Int. Cl.
| | | |
|---|---|---|
| *G01S 17/89* | (2020.01) | |
| *G06T 11/00* | (2006.01) | |
| *G06T 19/00* | (2011.01) | |
| *G06N 3/04* | (2006.01) | |
| *G06T 7/521* | (2017.01) | |
| *G06N 20/00* | (2019.01) | |

(52) U.S. Cl.
CPC ............ *G01S 17/89* (2013.01); *G06N 3/0454* (2013.01); *G06N 20/00* (2019.01); *G06T 7/521* (2017.01); *G06T 11/00* (2013.01); *G06T 19/00* (2013.01); *G06T 2210/12* (2013.01)

(58) Field of Classification Search
CPC . G06T 2207/30244; G06T 2207/10028; G06T 2207/10024; G06T 17/00; G06T 2207/20221; G06T 7/579; G06T 19/006; G06T 7/55; G06T 7/60; G06T 5/50; G06T 19/20; G06T 2200/04; G06T 2200/24; G06T 2207/10016; G06T 7/20; G06T 7/50; G06T 7/593; G06T 17/05; G06T 2207/10004; G06T 2207/10148
USPC .......................................................... 382/154
See application file for complete search history.

(56) References Cited

U.S. PATENT DOCUMENTS

| | | | |
|---|---|---|---|
| 2008/0089556 A1 | 4/2008 | Salgian et al. | |
| 2008/0294401 A1 | 11/2008 | Tsin et al. | |
| 2017/0186169 A1 | 6/2017 | Viswanath et al. | |
| 2018/0234669 A1* | 8/2018 | Chen ................... | H04N 13/221 |
| 2019/0147220 A1* | 5/2019 | McCormac .......... | G06K 9/6257 |
| | | | 382/103 |

(Continued)

FOREIGN PATENT DOCUMENTS

| | | |
|---|---|---|
| CN | 102520401 A | 6/2012 |
| CN | 108388723 A | 8/2018 |

*Primary Examiner* — Ajibola A Akinyemi

(57) ABSTRACT

Methods and apparatuses for generating a frame of semantically labeled 2D data are described. A frame of sparse 3D data is generated from a frame of sparse 3D data. Semantic labels are assigned to the frame of dense 3D data, based on a set of 3D bounding boxes determined for the frame of sparse 3D data. Semantic labels are assigned to a corresponding frame of 2D data based on a mapping between the frame of sparse 3D data and the frame of 2D data. The mapping is used to map a 3D data point in the frame of dense 3D data to a mapped 2D data point in the frame of 2D data. The semantic label assigned to the 3D data point is assigned to the mapped 2D data point. The frame of semantically labeled 2D data, including the assigned semantic labels, is outputted.

20 Claims, 7 Drawing Sheets

(56) References Cited

U.S. PATENT DOCUMENTS

2019/0392643 A1* 12/2019 Busto ................ G06K 9/00604

* cited by examiner

METHOD AND SYSTEM FOR SEMANTIC LABEL GENERATION USING SPARSE 3D DATA

FIELD

The present disclosure relates to generation of semantic labels for 2D data, using sparse 3D data.

BACKGROUND

An autonomous vehicle may use different sensors to sense its surrounding environment, and may process the raw sensor data received from the different sensors using a computer vision software system (hereinafter computer vision system) to perform object detection, classification, regression, and segmentation in order to detect and identify objects of interest (e.g., pedestrians or other cars). LIDAR sensors and camera sensors, such as optical camera sensors, are often used in autonomous vehicles.

Object detection, classification, regression, and segmentation using computer vision systems, whether implemented in an autonomous vehicle or in other devices and systems, are typically machine learning-based systems. Such machine learning-based systems typically require training with large amounts of data, for improved accuracy. For training a machine learning-based computer vision system to perform object detection, classification, regression, and segmentation, the training should be performed using datasets that include data having object labels. Inclusion of data having sematic labels in the form of bounding boxes and semantic masks in the dataset may also help to train a machine learning-based computer vision system. For training a machine learning-based computer vision system to perform object detection, classification, regression, and segmentation using 3D data (e.g., LIDAR data received from LIDAR sensors), there is currently a lack of datasets that include data having semantic labels (also referred to as "semantically labeled data") that can be used for training purposes. In particular, currently there is a lack of datasets that include data having semantic labels in the form of both 3D object bounding boxes and associated 3D semantic masks.

One of the challenges of training a machine learning-based computer vision system to perform object classification and segmentation is the shortage of datasets including semantically labeled data. Manual creation of semantically labeled data is time-consuming and expensive. Therefore, it would be desirable to provide a way to generate semantically labeled data with reduced human supervision.

SUMMARY

The present disclosure provides methods and systems for generating semantic labels in dense 2D datasets, from 3D bounding box annotations. Dense 3D data is generated from sparse 3D data (e.g., LIDAR data), to create better quality 2D masks. The sematic labels are used to generate semantically labeled data that can be used to further train a trained machine learning-based computer vision systems, with reduced human supervision.

In some example aspects, the present disclosure describes a method for generating a frame of semantically labeled 2D data. The method includes receiving a frame of sparse 3D data. The method also includes generating a frame of dense 3D data from the frame of sparse 3D data. The method also includes assigning semantic labels to the frame of dense 3D data, the semantic labels being assigned based on a set of 3D bounding boxes determined for the frame of sparse 3D data, wherein each data point in the frame of dense 3D data falling within a given 3D bounding box is assigned the semantic label associated with the given 3D bounding box. The method also includes assigning the semantic labels to a frame of 2D data that corresponds to the frame of sparse 3D data based on a mapping between the frame of sparse 3D data and the frame of 2D data, wherein the mapping is used to map a 3D data point in the frame of dense 3D data to a mapped 2D data point in the frame of 2D data, and wherein the semantic label assigned to the 3D data point is assigned to the mapped 2D data point. The method also includes outputting the frame of semantically labeled 2D data, including the assigned semantic labels.

In any of the above, the method may be repeated for a plurality of frames of sparse 3D data, to output a set of semantically labeled 2D data that comprises a corresponding plurality of frames of semantically labeled 2D data.

In any of the above, the frame of sparse 3D data may be received from a LIDAR sensor.

In any of the above, the frame of 2D data may be received from a camera.

In any of the above, the frame of 2D data may be received by performing a projection of the frame of dense 3D data.

In any of the above, generating the frame of dense 3D data may include: encoding the frame of sparse 3D data into sparse 2D xyz arrays, each sparse 2D xyz array representing a respective coordinate value of 3D data points in the sparse 3D data; generating a sparse 2D depth array from the sparse 2D xyz arrays; performing depth completion to generate a dense 2D depth array from the sparse 2D depth array; generating dense 2D xyz arrays from the sparse 2D xyz arrays, using information from the depth completion; and generating the frame of dense 3D data by performing an inverse mapping on the dense 2D xyz arrays.

In any of the above, the method may further include, after assigning the semantic labels to the frame of 2D data: filtering the frame of semantically labeled 2D data by applying a set of 2D bounding boxes, wherein any assigned label that does not agree with the 2D bounding boxes is discarded or relabeled.

In any of the above, generating the frame of dense 3D data may include: encoding the frame of sparse 3D data into a sparse 2D z array representing a z coordinate value of 3D data points in the sparse 3D data, wherein the sparse 2D z array is considered to be a sparse 2D depth array; performing depth completion to generate a dense 2D depth array from the sparse 2D depth array; and generating the frame of dense 3D data by performing back projection on the dense 2D depth array.

In any of the above, the set of 3D bounding boxes may be generated for the frame of sparse 3D data using a 3D neural network.

In some aspects, the present disclosure describes an apparatus for generating a frame of semantically labeled 2D data. The apparatus includes a processing unit, and memory coupled to the processing unit. The memory contains machine-executable instructions that, when executed by the processing unit, causes the apparatus to: receive a frame of sparse three-dimensional (3D) data; generate a frame of dense 3D data from the frame of sparse 3D data; assign semantic labels to the frame of dense 3D data, the semantic labels being assigned based on a set of 3D bounding boxes determined for the frame of sparse 3D data, wherein each data point in the frame of dense 3D data falling within a given 3D bounding box is assigned the semantic label associated with the given 3D bounding box; assign the semantic labels to a frame of 2D data that corresponds to the frame of sparse 3D data based on a mapping between the frame of sparse 3D data and the frame of 2D data, wherein the mapping is used to map a 3D data point in the frame of dense 3D data to a mapped 2D data point in the frame of 2D data, and wherein the semantic label assigned to the 3D data point is assigned to the mapped 2D data point; and output the frame of semantically labeled 2D data, including the assigned semantic labels.

In any of the above, the instructions may further cause the apparatus to output a set of semantically labeled 2D data that comprises a plurality of frames of semantically labeled 2D data.

In any of the above, the frame of sparse 3D data may be received from a LIDAR sensor.

In any of the above, the frame of 2D data may be received from a camera.

In any of the above, the frame of 2D data may be received by performing a projection of the dense 3D data.

In any of the above, the instructions may further cause the apparatus to generate the frame of dense 3D data by: encoding the frame of sparse 3D data into sparse 2D xyz arrays, each sparse 2D xyz array representing a respective coordinate value of 3D data points in the sparse 3D data; generating a sparse 2D depth array from the sparse 2D xyz arrays; performing depth completion to generate a dense 2D depth array from the sparse 2D depth array; generating dense 2D xyz arrays from the sparse 2D xyz arrays, using information from the depth completion; and generating the frame of dense 3D data by performing an inverse mapping on the dense 2D xyz arrays.

In any of the above, the instructions may further cause the apparatus to, after assigning the semantic labels to the frame of 2D data: filter the frame of semantically labeled 2D data by applying a set of 2D bounding boxes, wherein any assigned label that does not agree with the 2D bounding boxes is discarded or relabeled.

In any of the above, the instructions may further cause the apparatus to generate the frame of dense 3D data by: encoding the frame of sparse 3D data into a sparse 2D z array representing a z coordinate value of 3D data points in the sparse 3D data, wherein the sparse 2D z array is considered to be a sparse 2D depth array; performing depth completion to generate a dense 2D depth array from the sparse 2D depth array; and generating the frame of dense 3D data by performing back projection on the dense 2D depth array.

In any of the above, the set of 3D bounding boxes may be generated for the frame of sparse 3D data using a 3D neural network.

In some aspects, the present disclosure describes a method that includes obtaining a set of two-dimensional (2D) data having a plurality of frames of 2D data, and a corresponding set of sparse three-dimensional (3D) data having a plurality of frames of sparse 3D data. The method also includes obtaining a set of semantically labeled 2D data having a plurality of frames of semantically labeled 2D data by, for each frame of 2D data and each corresponding frame of sparse 3D data: applying a pre-trained 2D neural network to the frame of 2D data to generate a set of labeled 2D masks; applying a pre-trained 3D neural network to the frame of sparse 3D data to generate a set of 3D bounding boxes using the set of labeled 2D masks; correcting the generated set of 3D bounding boxes using an external resource; generating a new frame of sparse 3D data by selecting data points within the corrected set of 3D bounding boxes; generating a semantically labeled frame of 2D data from the generated new frame of sparse 3D data using any of the methods described above; updating a first ground truth dataset used to pre-train the 2D neural network to include the semantically labeled frame of 2D data and the generated set of labeled 2D masks; and updating a second ground truth dataset used to pre-train the 3D neural network to include the set of labeled 2D masks and the corrected set of 3D bounding boxes. The method also includes further training the 2D neural network using the updated first ground truth dataset, and training the 3D neural network using the second updated ground truth dataset.

In any of the above, the external resource may be another 3D neural network.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Autonomous vehicles are described as benefiting from examples of the present disclosure. However, the methods and systems disclosed herein may also be beneficial for and/or implemented outside of autonomous devices, for example in non-vehicular devices, and non-autonomous devices. For example, any system or device that uses a pre-trained machine learning-based computer vision system for object detection, classification, regression, and segmentation may benefit from examples disclosed herein. In the present disclosure, a pre-trained machine learning-based computer vision system may include any pre-trained machine learning algorithm which may be further trained using semantically labeled data t object detection, classification, regression, and segmentation. Further, examples of the present disclosure may be implemented in image processing devices, such as workstations (e.g., image processing workstations), or other computing devices not related to autonomous machines.

Although examples described herein refer to a car as the autonomous vehicle, the teachings of the present disclosure may be relevant to other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be relevant to non-vehicular devices, for example autonomous vacuum cleaners and lawn mowers.

Figure 1A:
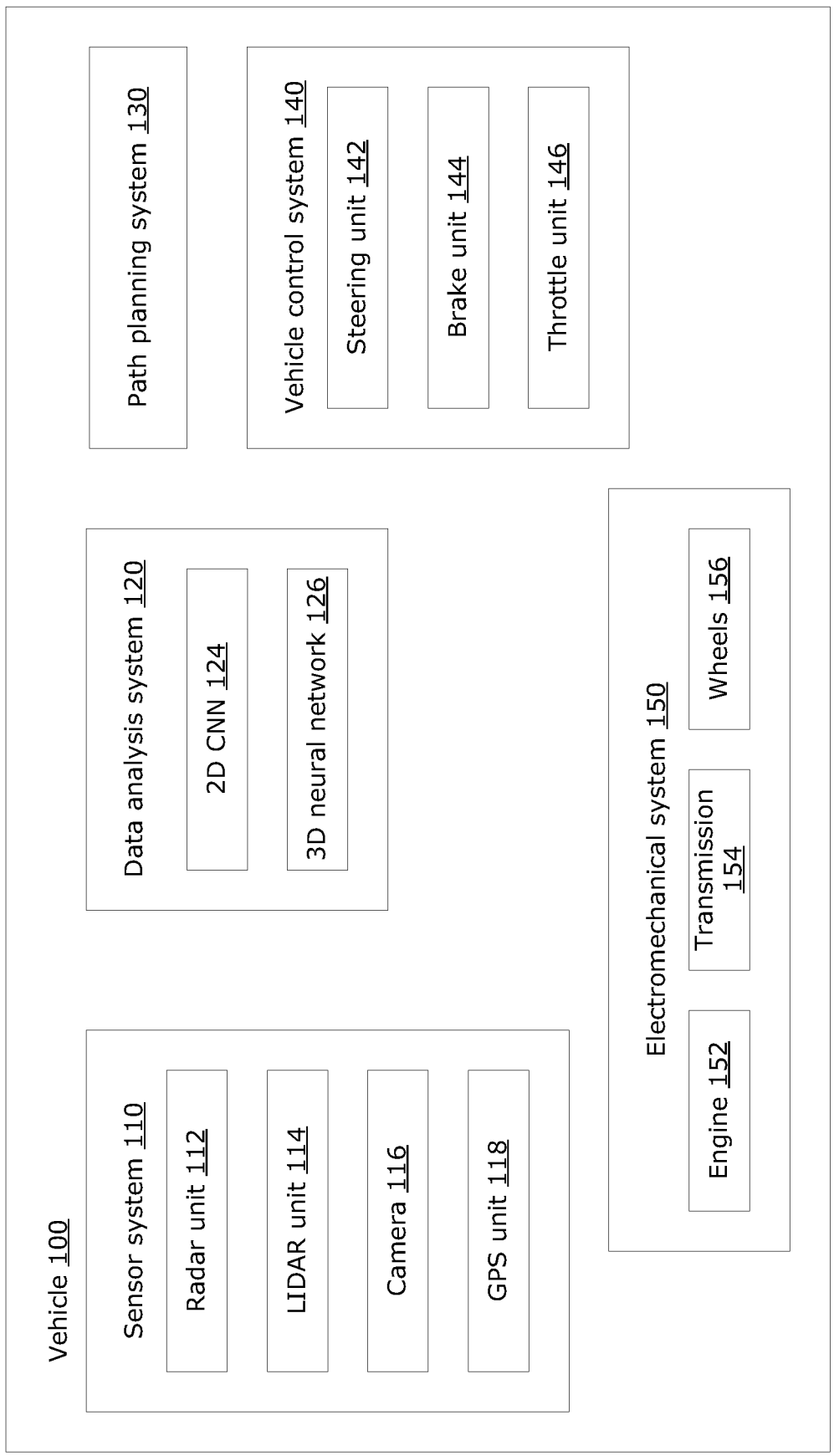
FIG. 1A is a block diagram illustrating some components of an example autonomous vehicle.

FIG. 1A is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular or non-vehicular machines, as discussed above. The vehicle 100 may benefit from examples disclosed herein.

The vehicle 100 includes a sensor system 110, a pre-trained computer vision system 120, a path planning system 130, a vehicle control system 140 and an electromechanical system 150, for example. Other systems and components may be included in the vehicle 100 as appropriate. Various systems and components of the vehicle may communicate with each other, for example through wired or wireless communication. For example, the sensor system 110 may communicate with the pre-trained computer vision system 120, path planning system 130 and the vehicle control system 140; the pre-trained computer vision system 120 may communicate with the path planning system 130 and the vehicle control system 140; the path planning system 130 may communicate with the vehicle control system 140; and the vehicle control system 140 may communicate with the electromechanical system 150.

The sensor system 110 includes various sensing units for collecting information about the internal and/or external environment of the vehicle 100. In the example shown, the sensor system 110 includes a radar unit 112, a LIDAR unit 114, a camera 116 and a global positioning system (GPS) unit 118 for collecting information about the external environment of the vehicle 100. The sensor system 110 may include other sensing units, such as a temperature sensor, precipitation sensor or microphone, among other possibilities.

The camera 116 may capture an image and/or video comprising a set of images, for example, and may generate image data representative of each image captured by the camera 116. The image data captured by the camera 116 may be two-dimensional (2D) image data. 2D image data may be captured over a period of time (e.g., in the case where the 2D data represents video images), and encoded as multiple frames of 2D data, where each frame corresponds to a particular time point. A set of 2D data (also referred to as a 2D dataset) may thus include a sequence of multiple frames of 2D data, each frame corresponding to a respective time point, which together span a certain time period. In the present disclosure, the term 2D data may be used to generally refer to a single frame of 2D data, or a 2D dataset. Each pixel in the 2D image may encode red, green, blue (RGB) intensity values. Generally, a frame of 2D data may include a set of 2D data points (also referred to as pixels, in the case of 2D image data). Each 2D data point may be represented as a data value stored in a 2D matrix, where the location of each entry in the 2D matrix corresponds to the location of a respective 2D data point. A label assigned to a data point may be stored in a 2D matrix at the corresponding location.

The LIDAR unit 114 may capture information in a wide view (e.g., 360° view) about the vehicle 100. The LIDAR unit 114 may capture three-dimensional (3D) information about the environment, and may be encoded in the form of a set of data points in 3D space (e.g., a 3D point cloud) and provided as 3D data, where each data point in the 3D data represents the 3D coordinates (e.g., x, y and z values in meters) of a sensed object in 3D space (e.g., representing the point of origin from which light is reflected from the object). 3D data may be captured over a period of time, and encoded as multiple frames of 3D data, where each frame corresponds to a particular time point. A set of 3D data (also referred to as a 3D dataset) may thus include a sequence of multiple frames of 3D data, each corresponding to a respective time point, which together span a certain time period. It should be noted that the frames of 3D data, captured over a certain time period, may correspond to time points that coincide or nearly coincide with frames of 2D data over the same time period. In the present disclosure, the term 3D data may be used to generally refer to a single frame of 3D data, or a 3D dataset. The data points in a 3D point cloud may be irregularly spaced, depending on the external environment. In some examples, in addition to 3D coordinates, each data point in the 3D data may also contain other information, such as intensity of reflected light or time of detection. Generally, a frame of 3D data may include a set of 3D data points, where each data point may be represented as a vector containing values of x, y, and z coordinates, and optionally other values (e.g., additional information such as intensity of reflected light or time of detection). The 3D data points, represented by vectors, may be arranged in a matrix where each row of the matrix corresponds to a respective 3D data point. A label assigned to a data point may be stored as an additional entry in the corresponding vector.

Generally, a frame of 3D data (such as 3D data generated by the LIDAR unit 114) may be relatively sparse, compared to the corresponding frame of 2D image data (such as 2D image data generated by the camera 116). For example, a typical frame of 2D image data may be composed of an ordered array of 1920×1080 pixels and capture a planar field-of-view (FOV). In comparison, a typical frame of 3D data from the LIDAR unit 114 may be composed of an unordered set of points over a 360° FOV, captured over 1800 scanning columns and 16 or 32 scanning rows. Thus, the 3D data may provide data points over a wider FOV and with lower resolution than the 2D image data. Accordingly, the 3D data (e.g., 3D data generated by the LIDAR unit 114) may be described herein as sparse 3D data.

Using the various sensing units 112, 114, 116, 118, the sensor system 110 may collect information about the local external environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). The sensor system 110 may also collect information about the position and orientation of the vehicle 100 relative to a frame of reference (e.g., using the GPS unit 118). The sensor system 110 may further collect information about the vehicle 100 itself. In such a case, the vehicle 100 may itself be considered part of the sensed environment. For example, the sensor system 110 may collect information from sensing units (e.g., accelerometers, speedometer, odometer and/or inertial measurement unit), which may or may not be part of the sensor system 110, to determine the state of the vehicle 100, such as linear speed, angular speed, acceleration and tire grip of the vehicle 100. The sensor system 110 may repeatedly (e.g., in regular intervals) receive information from its sensing units in real-time. The sensor system 110 may in turn provide sensor data in real-time or near real-time to other components of the vehicle 100.

The sensor system 110 communicates with the pre-trained computer vision system 120 to provide sensor data, including 2D image data and 3D data to the pre-trained computer vision system 120, which has been trained for inference using a training dataset, to detect and identify objects in the external environment, for example to detect and identify a pedestrian or another car. The pre-trained computer vision system 120 may use any suitable modules that implement machine learning processes to perform object detection, classification, regression, and segmentation on 2D data and 3D data to detect and identify objects. The pre-trained computer trained vision system 120 in this example includes modules that implement a 2D convolution neural network (CNN) 124 to perform object detection, classification, regression, and segmentation on 2D image data and a 3D neural network 126 to perform object detection, classification, regression, and segmentation on 3D data. The 2D CNN 124 and the 3D neural network are each pre-trained using a training dataset. The 2D CNN 124 may include sub-networks that perform object classification, regression, and segmentation on 2D data. Outputs from the 2D CNN 124 may include, for example, object class, 2D bounding box and 2D object segment (e.g., 2D object mask). The 2D CNN 124 may be any suitable 2D neural network. For example, the 2D CNN 124 may be a 2D regional CNN (RCNN) for 2D object detection, classification, regression, and segmentation on 2D data. Example 2D RCNNs include, for example, Fast RCNN, Faster RCNN, and Mask RCNN. The 3D neural network 126 may also include sub-networks that perform 3D object classification, regression, and segmentation on 3D data. Outputs from the 3D neural network 126 may include, for example, object class, 3D bounding box and 3D object segment (e.g. 3D object masks). The 3D neural network 126 may be any suitable 3D any suitable 3D neural network, such as 3D BoxNet, PointNet and PointNet++, among others.

The modules of the pre-trained computer vision system 120 may be implemented using software, which may include any number of independent or interconnected modules. For example, although illustrated as separate modules in FIG. 1A, the 2D CNN 124 and 3D neural network 126 may be implemented as a single module. The pre-trained computer vision system 120 may be implemented using a dedicated image processor, or may be implemented using one or more general processors of a vehicle controller (not shown) of the vehicle 100. The pre-trained computer vision system 120 may repeatedly (e.g., in regular intervals) receive sensor data from the sensor system 110 and perform object detection, classification, regression, and segmentation to detect and identify objects in real-time or near real-time. The output of the pre-trained computer visions system 120 may include, for example identification of detected objects, including object class, object bounding boxes, objection segments (e.g., object masks), object location and object boundary, in 2D and/or 3D space.

Sensor data from the sensor system 110 and the output from the pre-trained computer visions system 120 may be provided to the path planning system 130. The path planning system 130 carries out path planning for the vehicle 100. For example, the path planning system 130 may plan a path for the vehicle 100 to travel from a starting point to a target destination, using information from the GPS unit 118. The path planning system 130 may be implemented as one or more software modules or control blocks carried out by one or more processors in the vehicle 100. In some examples, the path planning system 130 may perform path planning at different levels of detail, for example on a mission planning level, on a behavior planning level, and on a motion planning level. The output from the path planning system 130 may include data defining one or more planned paths for the vehicle 100 to travel. The path planning carried out by the path planning system 130 is performed in real-time or near real-time, to enable the vehicle 100 to be responsive to real-time changes in the sensed environment. Output from the path planning system 130 may be provided to the vehicle control system 140.

The vehicle control system 140 serves to control operation of the vehicle 100. The vehicle control system 140 may be used to provide full, partial or assistive control of the vehicle 100. The vehicle control system 140 may serve to fully or partially control operation of the electromechanical system 150, when the vehicle 100 is operating autonomously or semi-autonomously, based on the planned path from the path planning system 130. Information from the sensor system 110 and/or the pre-trained computer vision system 120 may also be used by the vehicle control system 140. In this example, the vehicle control system 140 includes a steering unit 142, a brake unit 144 and a throttle unit 146. Each of these units 142, 144, 146 may be implemented as separate or integrated software modules or control blocks within the vehicle control system 140. The units 142, 144, 146 generate control signals to control the steering, braking and throttle, respectively, of the vehicle 100. The vehicle control system 140 may include additional components to control other aspects of the vehicle 100 including, for example, control of turn signals and brake lights.

The electromechanical system 150 receives control signals from the vehicle control system 140 to operate the mechanical components of the vehicle 100. The electromechanical system 150 effects physical operation of the vehicle 100. In the example shown, the electromechanical system 150 includes an engine 152, a transmission 154 and wheels 156. The engine 152 may be a gasoline-powered engine, an electricity-powered engine, or a gasoline/electricity hybrid engine, for example. Other components may be included in the electromechanical system 150, including, for example, turn signals, brake lights, fans and windows.

The vehicle 100 may include other components that are not shown, including, for example, a user interface system and a wireless communication system (e.g., including an antenna). These other components may also provide input to and/or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

The sensor system 110, data analysis system 120, path planning system 130 and the vehicle control system 140 may be individually or in combination be realized, at least in part, in one or more processors of the vehicle 100.

As discussed above, the autonomous vehicle 100 may use the pre-trained computer vision system 120 to perform object detection, classification, regression, and segmentation to detect and identify objects. The pre-trained computer vision system 120 includes the 2D CNN 124 and the 3D neural network 126, which may be deep neural networks, that that were trained using a training dataset to perform accurate object detection, classification, regression, and segmentation to detect and identify objects during inference. During inference, the pre-trained computer vision system 120 performs object detection, classification, regression, and segmentation on inputted data (e.g., real-life data captured by the sensor system 110) to detect and identify objects. The pre-trained computer vision system 120 is trained using a training dataset, and the more accurately and richly labeled the training data in the training dataset is, the more accurate the trained machine learning-based computer vision system 120 will be in real-life object detection, classification, regression, and segmentation. In particular, the 2D CNN 124 may be trained using semantically labeled, dense, 2D datasets.

In a semantically labeled dataset, every data point that is associated with an identified object (e.g., having been identified as belonging to a particular object class) is labeled with the object class. As may be appreciated, it is typically time-consuming and expensive for a human to manually identify and label each data point associated with each identified object in a dataset. This is particularly the case where there is a high number of frames in a dataset (e.g., where frames are captured at a high frequency), and where there is a large number of data points in each frame (e.g., in a dense, high resolution 2D image). In examples disclosed herein, semantic labels for dense 2D datasets may be generated with reduced or no human supervision.

Figure 1B:
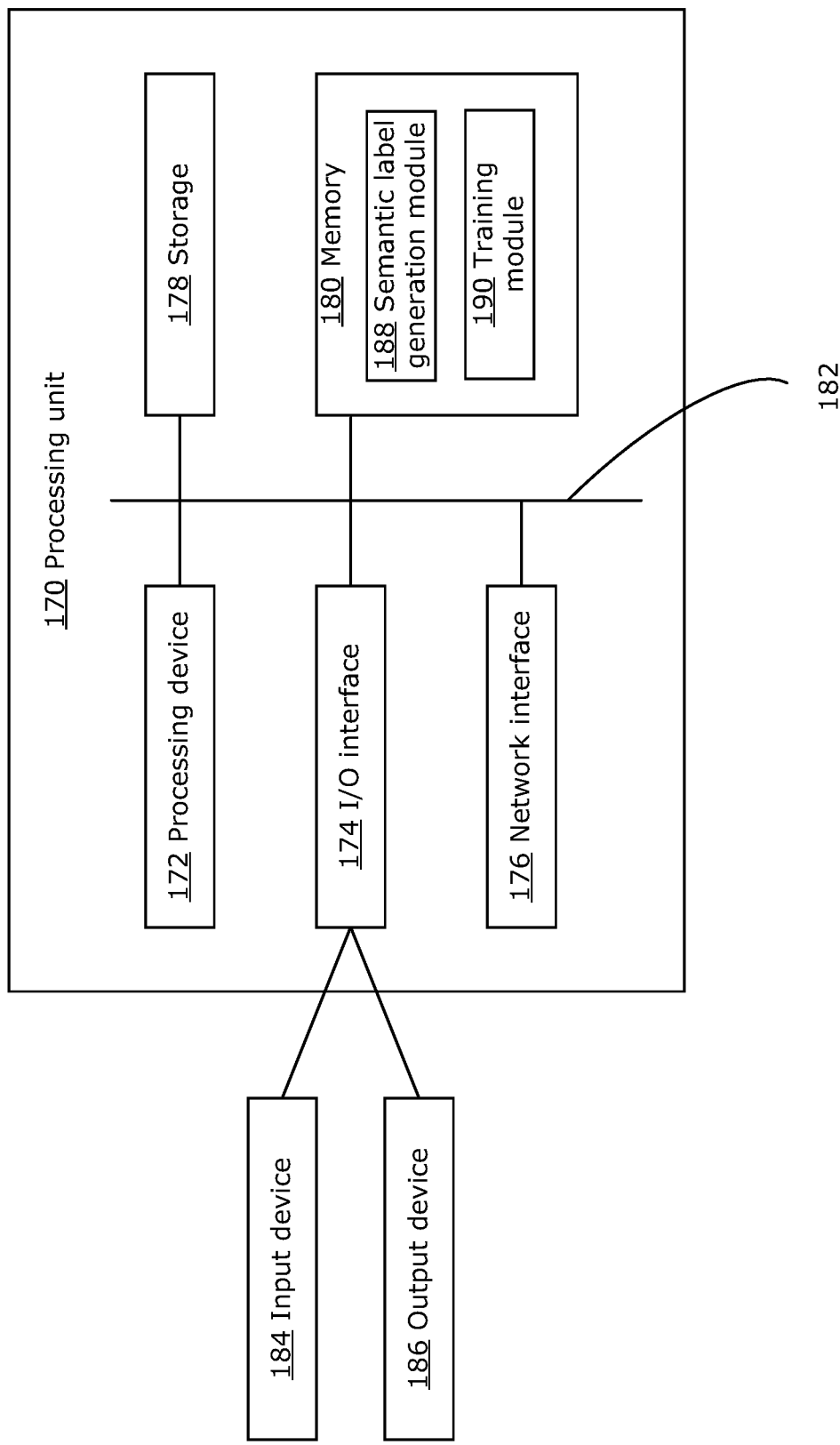
FIG. 1B is a block diagram illustrating an example processing system suitable for implementing examples disclosed herein.

FIG. 1B is a block diagram of an example simplified processing unit 170, which may be used to generate semantically labeled 2D data, in accordance with examples disclosed herein. The processing unit 170 could be a server or a desktop terminal, for example, or any suitable processing system. Other processing units suitable for implementing embodiments described in the present disclosure may be used, which may include components different from those discussed below. Although FIG. 1B shows a single instance of each component, there may be multiple instances of each component in the processing unit 170.

The processing unit 170 may include one or more processing devices 172, such as a processor, a microprocessor, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g., an intranet, the Internet, a P2P network, a WAN and/or a LAN) or other node. The network interfaces 176 may include wired links (e.g., Ethernet cable) and/or wireless links (e.g., one or more antennas) for intra-network and/or inter-network communications.

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The non-transitory memory(ies) 180 may store instructions for execution by the processing device(s) 172, such as to carry out examples described in the present disclosure. The memory(ies) 180 may include other software instructions, such as for implementing an operating system and other applications/functions. In some examples, one or more data sets and/or modules may be provided by an external memory (e.g., an external drive in wired or wireless communication with the processing unit 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

In FIG. 1B, the input device(s) 184 (e.g., a keyboard, a mouse, a microphone, a touchscreen, and/or a keypad) and output device(s) 186 (e.g., a display, a speaker and/or a printer) are shown as external to the processing unit 170. In other examples, one or more of the input device(s) 184 and/or the output device(s) 186 may be included as a component of the processing unit 170. In other examples, there may not be any input device(s) 184 and output device(s) 186, in which case the I/O interface(s) 174 may not be needed.

The memory(ies) 180 may include instructions for executing a semantic label generation module 188 which, when executed, causes the processing unit 170 to generate semantic labels for 2D data, using example methods disclosed herein. The memory(ies) 180 may further include instructions for executing a training module 190, which causes the processing unit 170 to further train a pre-trained machine learning-based computer vision system, such as pre-trained machine-learning based computer vision system 120, for example using a set of semantically labeled 2D data. The semantic label generation module 188 and the training module 190 may work together to generate semantically labeled data, and to use the semantically labeled data for further training of a pre-trained machine learning-based computer vision system, such as pre-trained computer vision system 120, to improve object detection, classification, regression, and segmentation performance, as discussed further below. For example, the training module 190 may be used to perform further training (e.g., including generating updated weights) for the 2D CNN 124 and 3D neural network 126 of the pre-trained computer visions system 120 of FIG. 1A.

Figure 2:
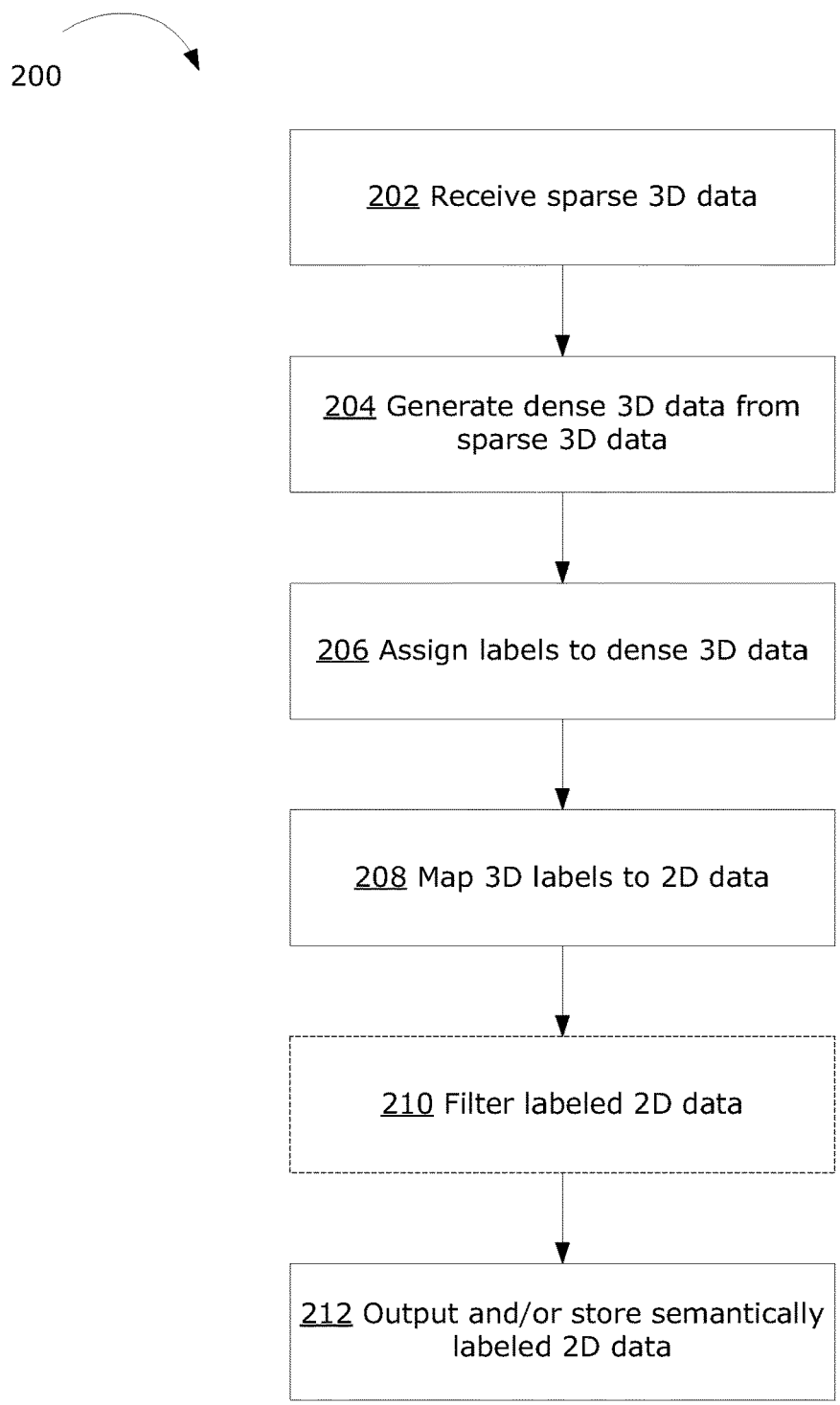
FIG. 2 is flowchart illustrating an example method for generating semantically labeled 2D data, using sparse 3D data.

FIG. 2 is a flowchart of an example method 200 for generating semantically labeled 2D data, using sparse 3D data. The method 200 may help to reduce or eliminate human supervision in generating semantically labeled 2D data. The method 200 may be performed by the processing unit 170 (e.g., using the semantic label generation module 188). Output from the method 200 (e.g., the semantically labeled 2D data) may be used to further train a pre-trained machine learning-based computer vision system designed to perform object detection, classification, regression, and segmentation, such as pre-trained computer vision system 120 of FIG. 1A.

At 202, a frame of sparse 3D data $P_S$ is received (e.g., in the form of a point cloud). The sparse 3D data $P_S$ may be generated by LIDAR unit 114, or generated by other sources of 3D data, such as radar sensors, infrared sensors or ultrasound sensor. The sparse 3D data $P_S$ may be encoded in the form of a point cloud, for example. The sparsity of the 3D data may limit the usefulness of the 3D data for generating 2D data labels. For example, projection or regression of 3D bounding boxes to a frame of 2D data may not be accurate when the 3D data is sparse.

The sparse 3D data $P_S$ has a plurality of 3D data points, each encoding an (x, y, z) coordinate. In some examples, other information (e.g., time stamp, time-of-flight, or other information) may be associated with each 3D data point.

At 204, a frame of dense 3D data $P_D$ is generated from the frame of sparse 3D data $P_S$. Generation of the dense 3D data $P_D$ may be performed using different suitable methods, as will be discussed further below.

At 206, labels are assigned to the dense 3D data $P_D$, based on 3D bounding boxes. The 3D bounding boxes may have been generated for the sparse 3D data $P_S$, using a machine learning-based regression module or system that is designed to generate 3D bounding boxes for certain object class(es). In some example, a 3D neural network, such as 3D BoxNet, may be used to generate 3D bounding boxes for certain object class(es). In some examples, the 3D bounding boxes may be generated using the dense 3D data $P_D$. Each 3D bounding box is associated with an object label, indicating a specific object class. Each 3D bounding box is also associated with single instance of that object class (referred to hereinafter as object instance). Each 3D bounding box also defines 3D boundaries.

The 3D bounding boxes can be used to assign labels to the dense 3D data $P_D$ regardless of whether the 3D bounding boxes were generated using the dense 3D data $P_D$ or using the sparse 3D data $P_S$. When the 3D bounding boxes are applied to the dense 3D data $P_D$, all the points falling within the boundaries of a given 3D bounding box are assigned to the object label and object instance associated with that given 3D bounding box. Any point in the dense 3D data $P_D$ that does not fall within any 3D bounding box may be left unlabeled, or may be assigned a default label (e.g., a label value of "–1").

At 208, the 3D labels are mapped to a corresponding frame of 2D data. The frame of 2D data corresponds to the frame of sparse 3D data $P_S$, in that the 2D data and the sparse 3D data $P_S$ have similar or at least overlapping FOVs and are captured at the same or similar point in time. In the context of an autonomous vehicle, such as the vehicle 100 of FIG. 1A, the 2D data may be 2D image data generated by the camera 116, and the sparse 3D data $P_S$ may be 3D data generated by the LIDAR unit 114. The 2D data may also be dense 2D data projected from the dense 3D data $P_D$.

In order to map the 3D labels to the 2D data, the relationship between the dense 3D data $P_D$ and the 2D data should be known. For example, the 3D data may be related to the 2D data using a camera projection matrix P. It should be noted that the relationship between the 3D data and the 2D data is the same whether the 3D data is sparse or dense, because densification of the 3D data does not change the FOV of the 3D data. The camera projection matrix P (typically a 3×4 camera projection matrix) defines how a 3D data point is projected or mapped to a 2D location in a 2D image plane. Where the 2D data represents data captured by an actual camera, the camera projection matrix P represents the actual 2D image plane of the camera. Where the 2D data is a projection of the 3D data, the camera projection matrix P represents the transformation that is used to project the 3D data onto the 2D plane.

Using the camera projection matrix P, the 3D data is related to the 2D data according to the following equation:

$$v = PV \qquad (0)$$

where $V=(X,Y,Z)$ defines the x, y and z coordinates of a 3D data point in the 3D data, and $v=(r,c)$ defines the row r and column c location of the data point when projected to the 2D data. Where appropriate, the values of r and c may be quantized such that they map to integer locations in the 2D data.

Using this relationship between the 3D data and the 2D data, any labeled assigned to a given 3D point V can be mapped and assigned to the corresponding 2D point v. This mapping may be performed for every labeled data point in the dense 3D data $P_D$. Any data point in the dense 3D data $P_D$ that has not been assigned a label may be ignored, in some examples. Any data point in the dense 3D data $P_D$ that has been assigned a default label (e.g., label value of "–1") may also be ignored, in some examples. After 3D labels have been mapped to the 2D data, any data point in the 2D data that has not been assigned a label may be left unlabeled, or may be assigned a default label (e.g., label value of "–1"). The result is a frame of dense 2D data $I_D$, with semantically labeled 2D data points (frame of semantically labeled 2D data $I_D$).

Optionally, at 210, the frame of semantically labeled 2D data $I_D$ may be filtered, in order to correct any mislabeled data points.

For example, depending on how the dense 3D data $P_D$ was generated at 204, there may be inaccuracies in how the 3D data has been mapped to the 2D data (e.g., there may be information redundancy and/or mismatch, as discussed further below). This may result in mislabeling of some data points in the frame of semantically labeled 2D data $I_D$. The mislabeled data points may be considered noise in the frame of semantically labeled 2D data $I_D$, and may be undesirable. In order to address this, the frame of semantically labeled 2D data $I_D$ may be filtered using 2D bounding boxes.

The 2D bounding boxes may be generated by projecting the 3D bounding boxes (used at step 206 above) to the 2D data (e.g., using the camera projection matrix P). In other examples, the 2D bounding boxes may be generated using a machine learning-based regression module or system, for example a 2D neural network, on the 2D data (assuming the 2D neural network is capable of labeling the same object class(es) as the 3D neural network). Each 2D bounding box should share the same object label and object instance as the corresponding 3D bounding box. Any assigned label that does not agree with the label of the 2D bounding boxes is discarded or relabeled. That is, any labeled data point in the semantically labeled 2D data $I_D$ that falls inside a 2D bounding box having the same label is considered to be accurately labeled and the assigned label is kept. Any labeled data point in the semantically labeled 2D data $I_D$ that falls inside a 2D bounding box having a different label, or that does not fall within a 2D bounding box is stripped of its label or is reassigned a default label.

In some examples, there may not be any mislabeling expected and step 210 may be omitted. In some examples, even where mislabeled data points are a possibility, it may be expected that such mislabeled data points would be relatively low in number, compared to the number of accurately labeled data points, and the impact of the mislabeled data points may be negligible or acceptable. Accordingly, in some examples, step 210 may be omitted even when mislabeled data points are a possibility.

At 212, the semantically labeled 2D data $I_D$ (that is, the 2D label including the labels assigned at 208) is outputted and/or stored. The semantically labeled 2D data $I_D$ may be used to further train the pre-trained machine learning-based computer vision system 120, including 2D neural network 124, as discussed further below. It should be noted that the 3D neural network used to generate the bounding boxes (used at step 206 above) may be capable of detecting object class(es) that are not recognized by the 2D neural network 124. In this way, the 2D neural network may be trained to detect new object class(es). The semantically labeled 2D data $I_D$ may be outputted and/or stored in association with the corresponding sparse 3D data $P_S$ or dense 3D data $P_D$.

Where there are multiple frames of 3D and 2D data, the method 200 may be repeated in order to generate semantic labels for each frame of 2D data. In this way, the method 200 may be used to generate a set of semantically labeled 2D data $I_D$.

Different depth completion methods may be used to perform step 204 described above. Two possible approaches are described below. Other suitable depth completion methods may be used.

Figure 3:
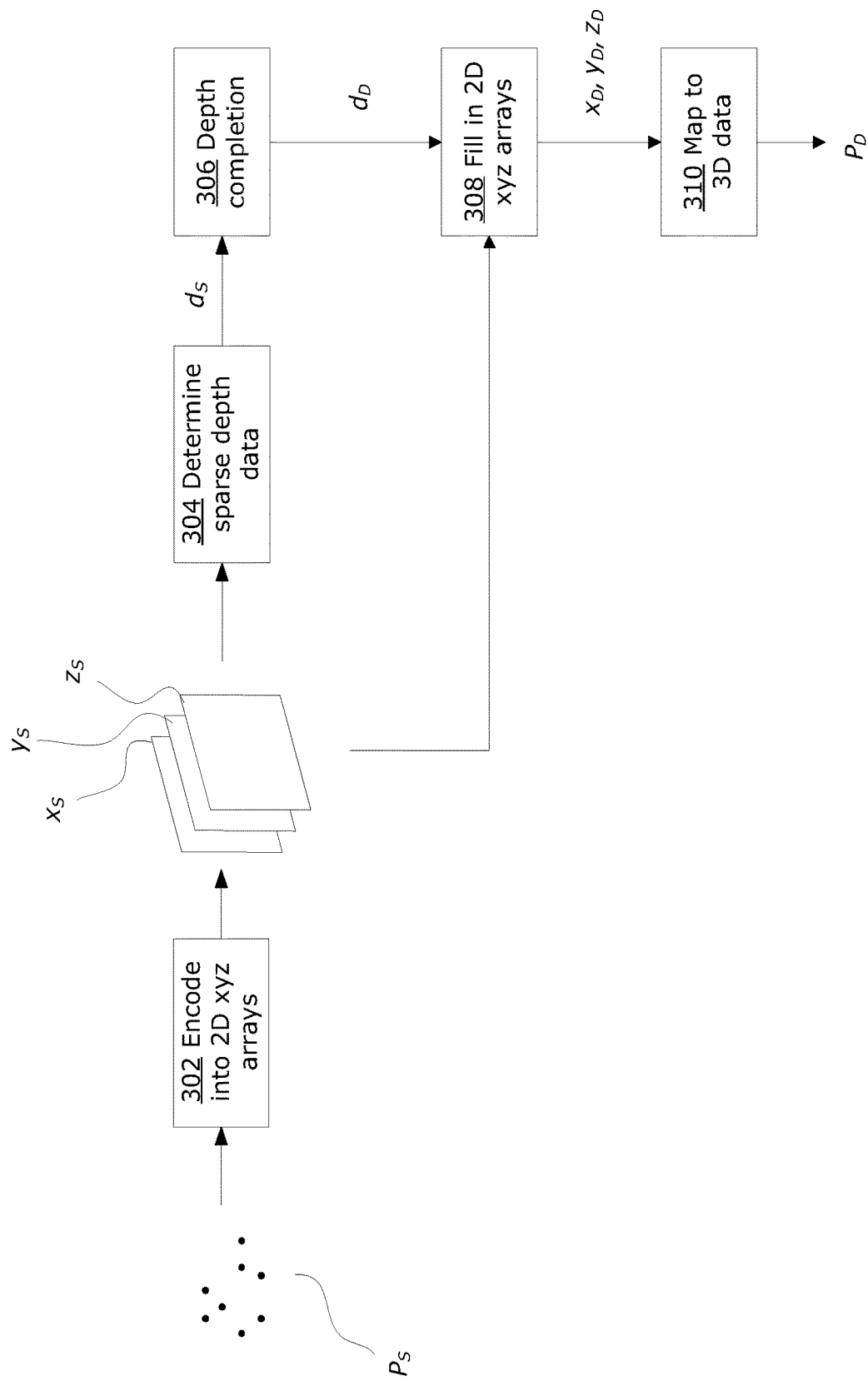
FIG. 3 is a block diagram that illustrates an example method for generating dense 3D data from sparse 3D data.

FIG. 3 is a block diagram that illustrates an example method for generating a frame of dense 3D data from a frame of sparse 3D data. The method illustrated in FIG. 3 may be used to perform step 204 of the method 200 described above.

Figure 4:
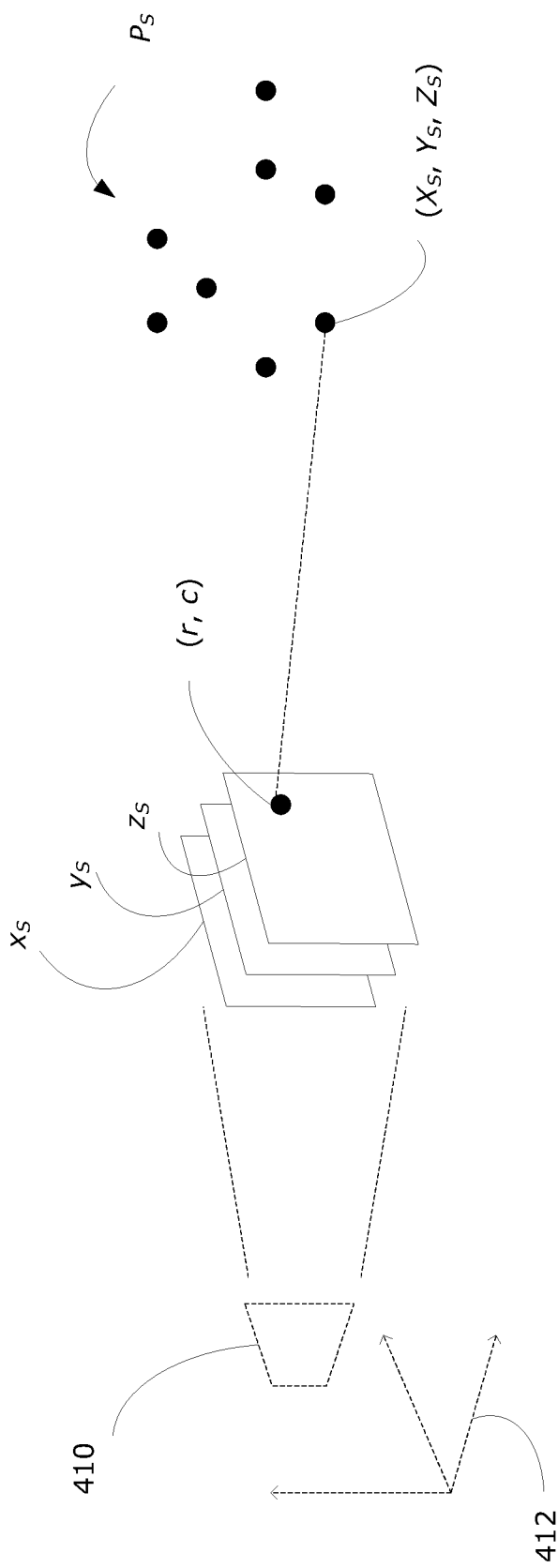
FIG. 4 conceptually illustrates an example for encoding 3D data into 2D arrays.

At 302, the sparse 3D data $P_S$ is encoded into 2D arrays $x_S$, $y_S$ and $z_S$ using the camera projection matrix P. As discussed above, the camera projection matrix P is used to map a 3D data point to a defined 2D plane. FIG. 4 illustrates how this projection is used to encode the 3D data into 2D arrays.

The camera projection matrix P may be conceptually represented by a virtual camera 410 having a certain orientation and location (represented by a virtual reference coordinate system 412) and a certain focus depth and certain FOV, as shown in FIG. 4. The camera projection matrix defines the 2D image plane of the virtual camera 410.

The 3D data point V having 3D coordinates $(X_S, Y_S, Z_S)$ in the sparse 3D data $P_S$ is mapped to a 2D data point v at row r and column c (r, c) as discussed above. For each data point v, the 3D coordinates are encoded as grayscale values $x_S$, $y_S$, $z_S$ in a respective one of three 2D xyz arrays. Where the 2D xyz arrays represent image data, each 2D data point corresponds to a pixel of the image. A first 2D array stores the value $x_S$ in the pixel position (r, c), a second 2D array stores the value $y_S$ in the pixel position (r, c), and a third 2D array stores the value $z_S$ in the pixel position (r, c). The grayscale values $x_S$, $y_S$, $z_S$ may be quantized and/or scaled to match the format for a 2D image. For example, typical grayscale values in a 2D image may be integer values in the range of [0, 255]. Accordingly, the following equations may be used to obtain the grayscale values:

$$x_S = \text{round}\left\{\left(\frac{X_S - X_{min}}{X_{max} - X_{min}}\right) \times 255\right\} \quad (1)$$

$$y_S = \text{round}\left\{\left(\frac{Y_S - Y_{min}}{Y_{max} - Y_{min}}\right) \times 255\right\}$$

$$z_S = \text{round}\left\{\left(\frac{Z_S - Z_{min}}{Z_{max} - Z_{min}}\right) \times 255\right\}$$

where the ranges $[X_{min}, X_{max}]$, $[Y_{min}, Y_{max}]$ and $[Z_{min}, Z_{max}]$ represent the maximum and minimum values for x, y and z coordinates in the 3D data. It should be noted that the 2D arrays $x_S$, $y_S$ and $z_S$ are sparse (i.e., not all entries of the 2D arrays contain projected data), because they are projected from the sparse 3D data $P_S$.

Reference is again made to FIG. 3. At 304, a 2D depth array containing sparse depth data $d_S$ is determined. In one example, the Euclidean distance may be calculated and used as the sparse depth data $d_S$ as follows:

$$d_S = \text{round}\left\{\sqrt{\frac{x_S^2 + y_S^2 + z_S^2}{3}}\right\} \quad (2)$$

In another example, the sparse depth data $d_S$ may be determined by using the z value as depth, that is: $z_S = d_S$. The sparse depth data $d_S$ is sparse in the sense that not every entry in the 2D depth array is filled.

At 306, the sparse depth data $d_S$ is converted to dense depth data $d_D$ using a suitable depth completion method, such as Image Processing for Basic Depth Completion (IP-Basic). The depth completion is performed such that the resulting dense depth data $d_D$ contains a depth value in every entry of the dense 2D depth array.

At 308, the sparse $x_S$, $y_S$ and $z_S$ 2D arrays are filled to produce dense 2D xyz arrays $x_D$, $y_D$ and $z_D$. The same completion method (e.g., IP-Basic) that was used to densify $d_S$ to $d_D$ is used in densification of $x_S$, $y_S$ and $z_S$ to $x_D$, $y_D$ and $z_D$. This may help to speed up the densification process, because empty entries need to be searched and found only once, based on the depth data, instead of searching each sparse $x_S$, $y_S$ and $z_S$ data separately. Any empty entries in the sparse depth data $d_S$ can be related to a corresponding empty entry in the sparse $x_S$, $y_S$ and $z_S$ data. Each of the sparse $x_S$, $y_S$ and $z_S$ data arrays are separately filled, to obtain dense 2D xyz arrays $x_D$, $y_D$ and $z_D$.

At 310, the dense 2D xyz arrays $x_D$, $y_D$ and $z_D$ are used to obtain dense 3D data $P_D$. The dense 3D data $P_D$ may be obtained by performing an inverse mapping, to map each $x_D$, $y_D$ and $z_D$ value back to 3D coordinates, using the inverse of equation (1):

$$X_D = \frac{x_D(X_{max} - X_{min})}{255} + X_{min} \quad (3)$$

$$Y_D = \frac{y_D(Y_{max} - Y_{min})}{255} + Y_{min}$$

$$Z_D = \frac{z_D(Z_{max} - Z_{min})}{255} + Z_{min}$$

where each $(X_D, Y_D, Z_D)$ is a 3D point in the dense 3D data $P_D$. The dense 3D data $P_D$ may then be used in the method 200, as discussed above.

It should be noted that, when the method of FIG. 3 is used to generate dense 3D data $P_D$, there is an information redundancy between the location (r, c) in the sparse 2D xyz arrays and the $x_S$, $y_S$ and $z_S$ data contained at that location. The redundancy arises because both (r, c) and $x_S$, $y_S$ and $z_S$ are calculated from $(X_S, Y_S, Z_S)$, using equation (0) and equation (1), respectively. When interpolation is performed to generate the dense 2D xyz arrays $x_D$, $y_D$ and $z_D$, this redundancy may result in mismatch, which can give rise to mislabeled data points in the labeled 2D data at step 208 of the method 200. As discussed above, such mislabeling may be negligible or acceptable, or may be corrected using filtering (at step 210).

Figure 5:
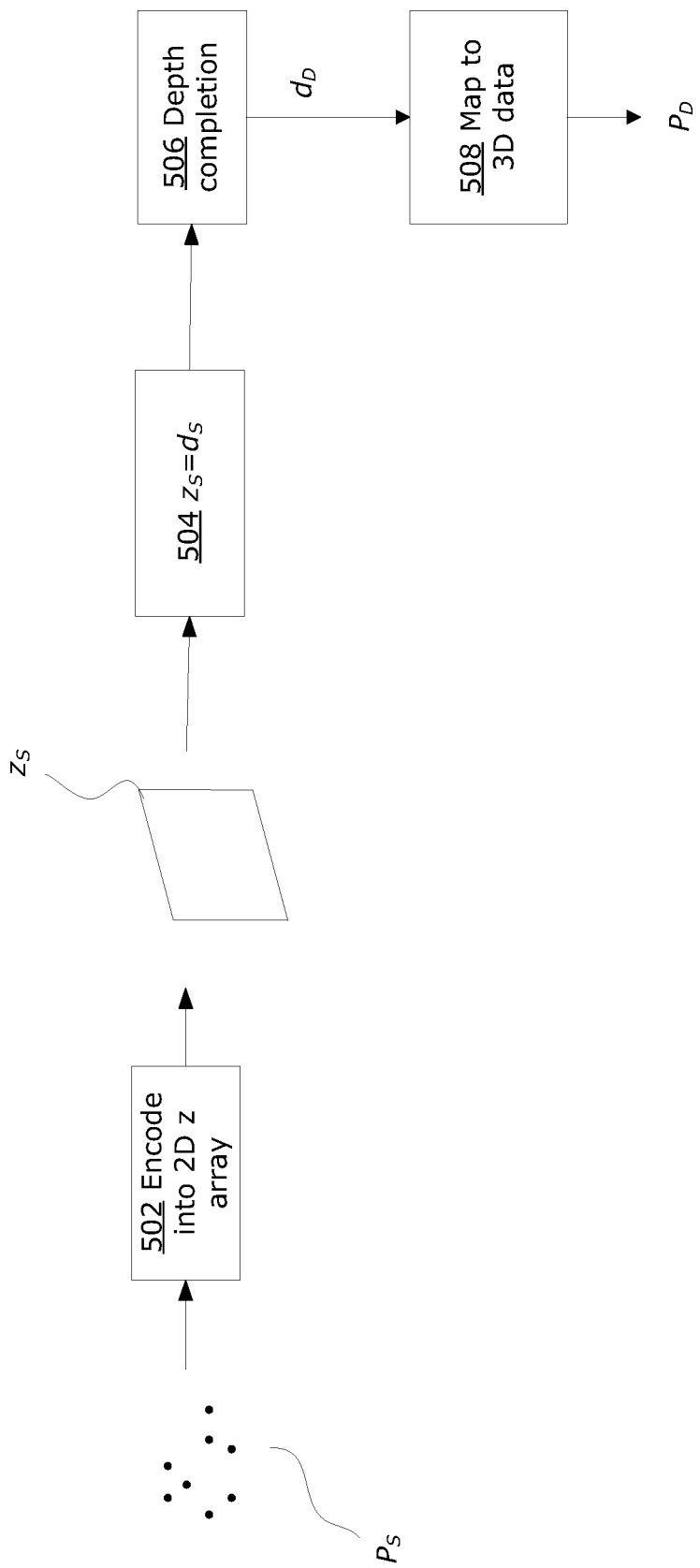
FIG. 5 is a block diagram that illustrates another example method for generating dense 3D data from sparse 3D data.

FIG. 5 is a block diagram that illustrates another example method for generating a frame of dense 3D data from a frame of sparse 3D data. The method illustrated in FIG. 5 may be an alternative approach to perform step 204 of the method 200 described above. The method illustrated in FIG. 5 may avoid the information redundancy mentioned above with respect to the method of FIG. 3.

At 502, the sparse 3D data $P_S$ is encoded into a sparse 2D array $z_S$ using the camera projection matrix P. This step may be similar to 302 described above, however only the z coordinate of the 3D data is encoded into a 2D array.

At 504, the sparse 2D depth array containing sparse depth data $d_S$ is determined by using the z value as depth, that is: $z_S = d_S$.

At 506, the sparse depth 2D depth array $d_S$ is converted to a dense 2D depth array $d_D$ using a suitable depth completion method, such as IP-Basic. 506 may be similar to 306 described above.

At 508, the dense 2D depth array $d_D$ used to generate the dense 3D data $P_D$. This may be performed using back projection of the camera projection matrix P. As discussed above, the projection of 3D data may be calculated as:

$$v = PV \qquad (0)$$

which may be written as:

$$\begin{bmatrix} r \\ c \\ 1 \end{bmatrix} = \begin{bmatrix} a_{00} & a_{01} & a_{02} & a_{03} \\ a_{10} & a_{11} & a_{12} & a_{13} \\ a_{20} & a_{21} & a_{22} & a_{23} \end{bmatrix} \begin{bmatrix} X \\ Y \\ Z \end{bmatrix} \qquad (4)$$

where $a_{ij}$ are the elements of the camera projection matrix P.

Equation (4) can be rewritten to solve for X and Y, given Z=d is known, as follows:

$$\begin{bmatrix} a_{00} - ra_{20} & a_{01} - ra_{21} \\ a_{10} - ca_{20} & a_{11} - ca_{21} \end{bmatrix} \begin{bmatrix} X \\ Y \end{bmatrix} = \begin{bmatrix} ra_{23} - a_{03} - (a_{02} - ra_{22})Z \\ ca_{23} - a_{13} - (a_{12} - ca_{22})Z \end{bmatrix} \qquad (5)$$

By solving equation (5), X and Y can be obtained for each 2D entry at (r, c). Because the values in the matrices of equation (5) change with each location (r, c), solving equation (5) may be computationally complex.

The calculated X and Y values, together with the Z value, are used as the 3D coordinates of the data point in the dense 3D data $P_D$. The dense 3D data $P_D$ may then be used in the method 200, as discussed above.

Figure 6:
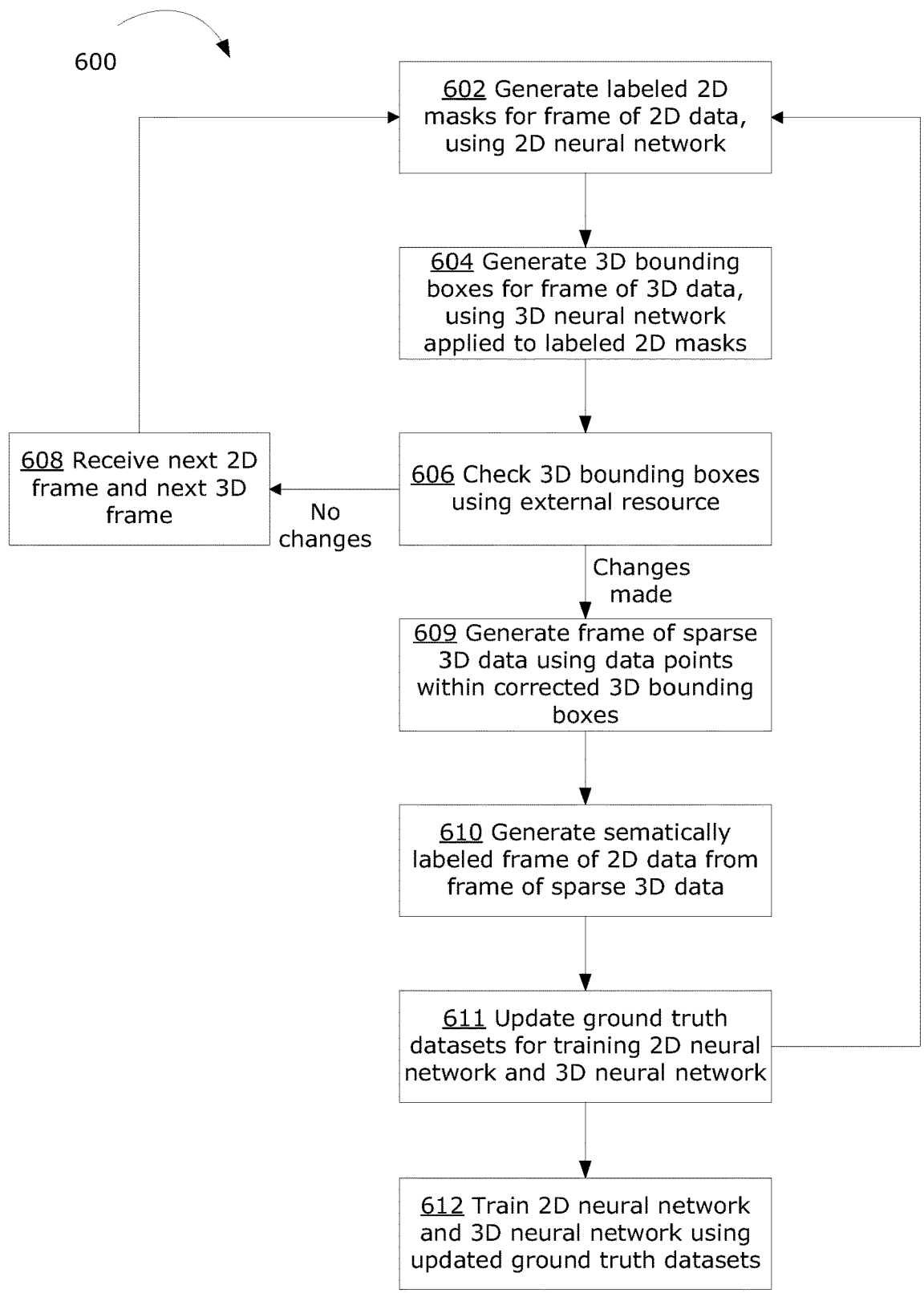
FIG. 6 is a flowchart illustrating an example method for training a machine learning-based process, using data with generated semantic labels.

FIG. 6 is a flowchart illustrating an example method 600 for further training a pre-trained machine learning-based computer vision system, such as pre-trained computer vision system 120, using a set of semantically labeled data (e.g., generated using the method 200 described above). The method 600 may be performed by the processing unit 170 by executing the computer-readable instructions of the training module 190 to further train a pre-trained machine-learning based computer vision system, such as pre-trained machine-learning based computer vision system 120. The pre-trained computer vision system 120 (e.g., pre-trained 2D and 3D neural networks 124, 126) are pre-trained using frames of 2D ground truth data and ground truth of 3D bounding boxes. The pre-trained computer vision system 120 is further trained according to the method 600. The following discussion refers to 2D and 3D neural networks 124, 126 as examples of machine learning-based modules that may be used in and further trained by the method 600. However, it should be understood that any trained machine learning-based modules (e.g., including approaches that do not use neural networks) may be used in the method 600, instead of neural networks, in a similar way.

The method 600 may be performed using a set of 2D data (e.g., 2D image data received from a camera, or 2D projection of 3D data) having multiple frames, and a corresponding set of 3D data (e.g., LIDAR data in the form of a 3D point cloud) having a corresponding number of frames. Further training of the pre-trained computer vision system 120 is performed using one frame of 2D data and one frame of 3D data at a time, where the frame of 2D data and the frame of 3D data correspond to the same or approximately same time point. It should be understood that the method 600 may also be performed using a single frame of 2D data and a corresponding single frame of 3D data.

At 602, the pre-trained 2D neural network 124 receives a frame of 2D data and generates a set of labeled 2D masks from the frame of 2D data. The pre-trained neural network 124 generates a labeled 2D mask for each instance of an object class. There may be multiple labeled 2D masks generated for the frame of 2D data, and the generated labeled 2D masks may include different object classes (e.g., where the 2D neural network is capable of object classification for multiple object classes). In some cases, there may not be any labeled 2D mask generated for the frame of 2D data (e.g., where the frame does not contain any instances of the object class(es) of interest), in which case the method 600 may skip to 608 to receive the next frame of 2D data.

At 604, the pre-trained 3D neural network 126 receives a corresponding frame of sparse 3D data and generates 3D bounding box(es) for the frame of 3D data. The 3D bounding box(es) may be estimated from the 2D mask(s) generated at 602. Any suitable pre-trained 3D neural network 126, such as 3D BoxNet, may be used to generate the 3D bounding box(es). In other examples, the 3D bounding box(es) may be generated without using the 2D mask(s). The 3D bounding box(es) may include object class(es) that are not generated by the 2D neural network.

At 606, each estimated bounding box is checked using an external resource. For example, another machine learning-based system or module may be used to check the accuracy of the 3D bounding box(es). In another example, the 3D bounding box(es) may be checked against a set of previously generated and bounding box(es) for the same frame of 3D data. In another example, a human supervisor may check the estimated bounding box(es).

Checking the 3D bounding box(es) may include correcting the boundaries of a bounding box, correcting the object label of a 3D bounding box, deleting a 3D bounding box and adding a 3D bounding box, for example.

If no changes are made to the 3D bounding box(es), the method 600 proceeds to 608 to receive the next frame of 2D data and corresponding next frame of 3D data. After receiving the next frame of 2D data, the method 600 returns to 602. If there is no next frame of 2D data (i.e., all the data has been processed) the method 600 proceeds to 612, discussed further below.

If any changes have been made to the 3D bounding box(es), the method 600 proceeds to 609.

At 609, a new frame of sparse 3D data is generated from the 3D bounding box annotations. The generated new frame of sparse 3D data is generated using 3D data points that fall within the corrected 3D bounding boxes.

At 610, 2D semantic label(s) are generated for the generated new frame of sparse 3D data, using the method 200 described above. In some examples, the 2D semantic label(s) may be generated only for the 3D bounding box(es) for which changes have been made or which are newly added by the external resource. For 3D bounding box(es) which have been deleted by the external resource, the corresponding 2D labeled mask in the 2D data may be identified and removed. In other examples, step 610 may involve generating a new set of 2D semantic label(s) using the method 200 to replace the previous set of 2D semantic label(s) generated at 602.

At 611, the ground truth datasets that are used to respectively train the 2D neural network 124 and the 3D neural network 126 are updated with the corrected frames. Specifically, a first ground truth dataset, which is used to train the 2D neural network 124, is updated to include the semantically labeled frame of 2D data with the set of labeled 2D mask(s). Similarly, a second ground truth dataset, which is used to train the 3D neural network 126, is updated to include the set of labeled 2D mask(s) and the set of corrected 3D bounding box(es). After updating the ground truth datasets, the method 600 returns to 602 to process the next frame of 2D data and corresponding next frame of 3D data. If there is no next frame of 2D data and corresponding frame of 3D data (i.e., all the data has been processed) the method 600 proceeds to 612.

At 612, the updated ground truth datasets are used to further train the 2D neural network and the 3D neural network.

The pre-trained machine learning-based computer vision system 120, (e.g., the 2D neural network 124 and the 3D neural network 126), that have been further trained using the method 600 may be used for object detection, classification, regression, and segmentation, in an autonomous vehicle, for example. Further training of the pre-trained machine learning-based computer vision system 120 may be continuous and may take place in parallel with using the further trained machine learning-based computer vision system 120 for inference on real-life data.

The present disclosure describes methods for generating 2D semantic labels from 3D bounding box annotations. The disclosed methods include generation of dense 3D data from sparse 3D data, and uses the dense 3D data together with 3D annotations to generate better quality 2D semantic masks for 2D data.

In various examples, the present disclosure describes methods to generate 2D semantic labels from 3D bounding box annotations and sparse 3D data and to generate semantically labeled 2D data. Dense 3D data is generated from sparse 3D data, in order to obtain better quality 2D semantic labels for 2D data.

In some examples, the present disclosure describes training methods in which human supervision is reduced, by providing at least some automation of semantic label generation. For example, if there are any changes to the inferred 3D bounding boxes, the updated bounding box annotation can be automatically used to generate updated 2D semantic labels. In this way, the time and effort required to provide ground-truth training data may be reduced. Over time, the errors of the machine learning-based systems will reduce, thus further reducing the time and effort required for annotating training data. The automatically annotated data may serve as starting estimates for labeling data.

Examples described herein may be used to generate new training data (e.g., semantically labeled 2D data) for new object classes, or for object classes with a limited number of existing training data, where 2D semantic labels are not available but 3D bounding box annotations are available.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating a frame of semantically labeled two dimensional (2D) data, the method comprising:
   receiving a frame of sparse three-dimensional (3D) data;
   generating a frame of dense 3D data from the frame of sparse 3D data by:
   encoding the frame of sparse 3D data into sparse 2D xyz arrays, each sparse 2D xyz array representing a respective coordinate value of 3D data points in the sparse 3D data;
   generating a sparse 2D depth array from the sparse 2D xyz arrays;
   performing depth completion to generate a dense 2D depth array from the sparse 2D depth array;
   generating dense 2D xyz arrays from the sparse 2D xyz arrays, using information from the depth completion; and
   generating the frame of dense 3D data by performing an inverse mapping on the dense 2D xyz arrays;
   assigning semantic labels to the frame of dense 3D data, the semantic labels being assigned based on a set of 3D bounding boxes determined for the frame of sparse 3D data, wherein each data point in the frame of dense 3D data falling within a given 3D bounding box is assigned the semantic label associated with the given 3D bounding box;
   assigning the semantic labels to a frame of 2D data that corresponds to the frame of sparse 3D data based on a mapping between the frame of sparse 3D data and the frame of 2D data, wherein the mapping is used to map a 3D data point in the frame of dense 3D data to a mapped 2D data point in the frame of 2D data, and wherein the semantic label assigned to the 3D data point is assigned to the mapped 2D data point; and
   outputting the frame of semantically labeled 2D data, including the assigned semantic labels.

2. The method of claim 1, wherein the method is repeated for a plurality of frames of sparse 3D data, to output a set of semantically labeled 2D data that comprises a corresponding plurality of frames of semantically labeled 2D data.

3. The method of claim 1, wherein the frame of sparse 3D data is received from one of a LIDAR sensor and a camera.

4. The method of claim 1, wherein the frame of 2D data is received by performing a projection of the frame of dense 3D data.

5. The method of claim 1, further comprising, after assigning the semantic labels to the frame of 2D data:
filtering the frame of semantically labeled 2D data by applying a set of 2D bounding boxes, wherein any assigned label that does not agree with the 2D bounding boxes is discarded or relabeled.

6. A method for generating a frame of semantically labeled two dimensional (2D) data, the method comprising:
receiving a frame of sparse three-dimensional (3D) data;
generating a frame of dense 3D data from the frame of sparse 3D data by:
encoding the frame of sparse 3D data into a sparse 2D z array representing a z coordinate value of 3D data points in the sparse 3D data, wherein the sparse 2D z array is considered to be a sparse 2D depth array;
performing depth completion to generate a dense 2D depth array from the sparse 2D depth array; and
generating the frame of dense 3D data by performing back projection on the dense 2D depth array;
assigning semantic labels to the frame of dense 3D data, the semantic labels being assigned based on a set of 3D bounding boxes determined for the frame of sparse 3D data, wherein each data point in the frame of dense 3D data falling within a given 3D bounding box is assigned the semantic label associated with the given 3D bounding box;
assigning the semantic labels to a frame of 2D data that corresponds to the frame of sparse 3D data based on a mapping between the frame of sparse 3D data and the frame of 2D data, wherein the mapping is used to map a 3D data point in the frame of dense 3D data to a mapped 2D data point in the frame of 2D data, and wherein the semantic label assigned to the 3D data point is assigned to the mapped 2D data point; and
outputting the frame of semantically labeled 2D data, including the assigned semantic labels.

7. The method of claim 1, wherein the set of 3D bounding boxes is generated for the frame of sparse 3D data using a 3D neural network.

8. The method of claim 6, wherein the method is repeated for a plurality of frames of sparse 3D data, to output a set of semantically labeled 2D data that comprises a corresponding plurality of frames of semantically labeled 2D data.

9. The method of claim 6, wherein the frame of sparse 3D data is received from one of a LIDAR sensor and a camera.

10. The method of claim 6, wherein the frame of 2D data is received by performing a projection of the frame of dense 3D data.

11. The method of claim 6, further comprising, after assigning the semantic labels to the frame of 2D data:
filtering the frame of semantically labeled 2D data by applying a set of 2D bounding boxes, wherein any assigned label that does not agree with the 2D bounding boxes is discarded or relabeled.

12. An apparatus for generating a frame of semantically labeled two dimensional (2D) data, the apparatus comprising:
a processing unit; and
a memory coupled to the processing unit, the memory containing machine-executable instructions that, when executed by the processing unit, causes the apparatus to:
receive a frame of sparse three-dimensional (3D) data;
generate a frame of dense 3D data from the frame of sparse 3D data by:
encoding the frame of sparse 3D data into sparse 2D xyz arrays, each sparse 2D xyz array representing a respective coordinate value of 3D data points in the sparse 3D data;
generating a sparse 2D depth array from the sparse 2D xyz arrays;
performing depth completion to generate a dense 2D depth array from the sparse 2D depth array;
generating dense 2D xyz arrays from the sparse 2D xyz arrays, using information from the depth completion; and
generating the frame of dense 3D data by performing an inverse mapping on the dense 2D xyz arrays;
assign semantic labels to the frame of dense 3D data, the semantic labels being assigned based on a set of 3D bounding boxes determined for the frame of sparse 3D data, wherein each data point in the frame of dense 3D data falling within a given 3D bounding box is assigned the semantic label associated with the given 3D bounding box;
assign the semantic labels to a frame of 2D data that corresponds to the frame of sparse 3D data based on a mapping between the frame of sparse 3D data and the frame of 2D data, wherein the mapping is used to map a 3D data point in the frame of dense 3D data to a mapped 2D data point in the frame of 2D data, and wherein the semantic label assigned to the 3D data point is assigned to the mapped 2D data point; and
output the frame of semantically labeled 2D data, including the assigned semantic labels.

13. The apparatus of claim 12, wherein the instructions further cause the apparatus to output a set of semantically labeled 2D data that comprises a plurality of frames of semantically labeled 2D data.

14. The apparatus of claim 12, wherein the frame of sparse 3D data is received from one of a LIDAR sensor and a camera.

15. The apparatus of claim 12, wherein the frame of 2D data is received by performing a projection of the dense 3D data.

16. The apparatus of claim 12, wherein the instructions further cause the apparatus to, after assigning the semantic labels to the frame of 2D data:
filter the frame of semantically labeled 2D data by applying a set of 2D bounding boxes, wherein any assigned label that does not agree with the 2D bounding boxes is discarded or relabeled.

17. The apparatus of claim 12, wherein the set of 3D bounding boxes is generated for the frame of sparse 3D data using a 3D neural network.

18. An apparatus for generating a frame of semantically labeled two dimensional (2D) data, the apparatus comprising:
a processing unit; and
a memory coupled to the processing unit, the memory containing machine-executable instructions that, when executed by the processing unit, causes the apparatus to:
receive a frame of sparse three-dimensional (3D) data;
generate a frame of dense 3D data from the frame of sparse 3D data by:
encoding the frame of sparse 3D data into a sparse 2D z array representing a z coordinate value of 3D data points in the sparse 3D data, wherein the sparse 2D z array is considered to be a sparse 2D depth array;

performing depth completion to generate a dense 2D depth array from the sparse 2D depth array; and generating the frame of dense 3D data by performing back projection on the dense 2D depth array;

assign semantic labels to the frame of dense 3D data, the semantic labels being assigned based on a set of 3D bounding boxes determined for the frame of sparse 3D data, wherein each data point in the frame of dense 3D data falling within a given 3D bounding box is assigned the semantic label associated with the given 3D bounding box;

assign the semantic labels to a frame of 2D data that corresponds to the frame of sparse 3D data based on a mapping between the frame of sparse 3D data and the frame of 2D data, wherein the mapping is used to map a 3D data point in the frame of dense 3D data to a mapped 2D data point in the frame of 2D data, and wherein the semantic label assigned to the 3D data point is assigned to the mapped 2D data point; and output the frame of semantically labeled 2D data, including the assigned semantic labels.

19. A method comprising:

obtaining a set of two-dimensional (2D) data having a plurality of frames of 2D data, and a corresponding set of sparse three-dimensional (3D) data having a plurality of frames of sparse 3D data;

obtaining a set of semantically labeled 2D data having a plurality of frames of semantically labeled 2D data by, for each frame of 2D data and each corresponding frame of sparse 3D data:

applying a pre-trained 2D neural network to the frame of 2D data to generate a set of labeled 2D masks;

applying a pre-trained 3D neural network to the frame of sparse 3D data to generate a set of 3D bounding boxes using the set of labeled 2D masks;

correcting the generated set of 3D bounding boxes using an external resource;

generating a new frame of sparse 3D data by selecting data points within the corrected set of 3D bounding boxes;

generating a semantically labeled frame of 2D data from the generated new frame of sparse 3D data using the method of claim 1;

updating a first ground truth dataset used to pre-train the 2D neural network to include the semantically labeled frame of 2D data and the generated set of labeled 2D masks; and updating a second ground truth dataset used to pre-train the 3D neural network to include the set of labeled 2D masks and the corrected set of 3D bounding boxes; and further training the 2D neural network using the updated first ground truth dataset, and training the 3D neural network using the second updated ground truth dataset.

20. The method of claim 19, wherein the external resource is another 3D neural network.

* * * * *